United States Patent [19]

Woidt et al.

[11] Patent Number: 4,713,126
[45] Date of Patent: Dec. 15, 1987

[54] PROCESS FOR MANUFACTURING NEGATIVE CADMIUM ELECTRODES FOR SEALED ALKALINE BATTERY CELLS

[75] Inventors: Jurgen Woidt; Wolfgang Fries, both of Hagen, Fed. Rep. of Germany

[73] Assignee: Varta Batterie A.G., Hanover, Fed. Rep. of Germany

[21] Appl. No.: 861,099

[22] Filed: May 8, 1986

[30] Foreign Application Priority Data

May 28, 1985 [DE] Fed. Rep. of Germany ....... 3519051

[51] Int. Cl.$^4$ .................... H01M 10/24; H01M 10/34
[52] U.S. Cl. .............................. 148/6.14 R; 148/6.24; 429/222; 429/60
[58] Field of Search ................................ 429/222, 60; 148/6.14 R, 6.24

[56] References Cited

U.S. PATENT DOCUMENTS 3,302,091 1/1967 Henderson ........................... 429/222

FOREIGN PATENT DOCUMENTS 0143670 11/1981 Japan ................................... 429/222
0154461 8/1985 Japan ................................... 429/222

Primary Examiner—Sam Silverberg
Attorney, Agent, or Firm—Weiser & Stapler

[57] ABSTRACT

Undesirable heavy metal peroxides formed during the continuous partial oxidation of cadmium electrodes made from a charged strip of material, by means of $H_2O_2$, to introduce a charge reserve prior to incorporation in a sealed alkaline battery cell, are removed by an immersion treatment in an alkaline hydroxide solution, with simultaneous desorption of oxygen and removal of the heat of hydrogenation. A subsequent boric acid immersion bath is used to neutralize introduced alkaline residues and to improve the stability of the strip during storage. The phenomena which accompany peroxide decomposition (intense evolution of heat and sputtering of electrolyte) in the completely assembled cell during the introduction of the electrolyte, and which interfere with the metering of the electrolyte, are thus avoided.

14 Claims, 1 Drawing Figure

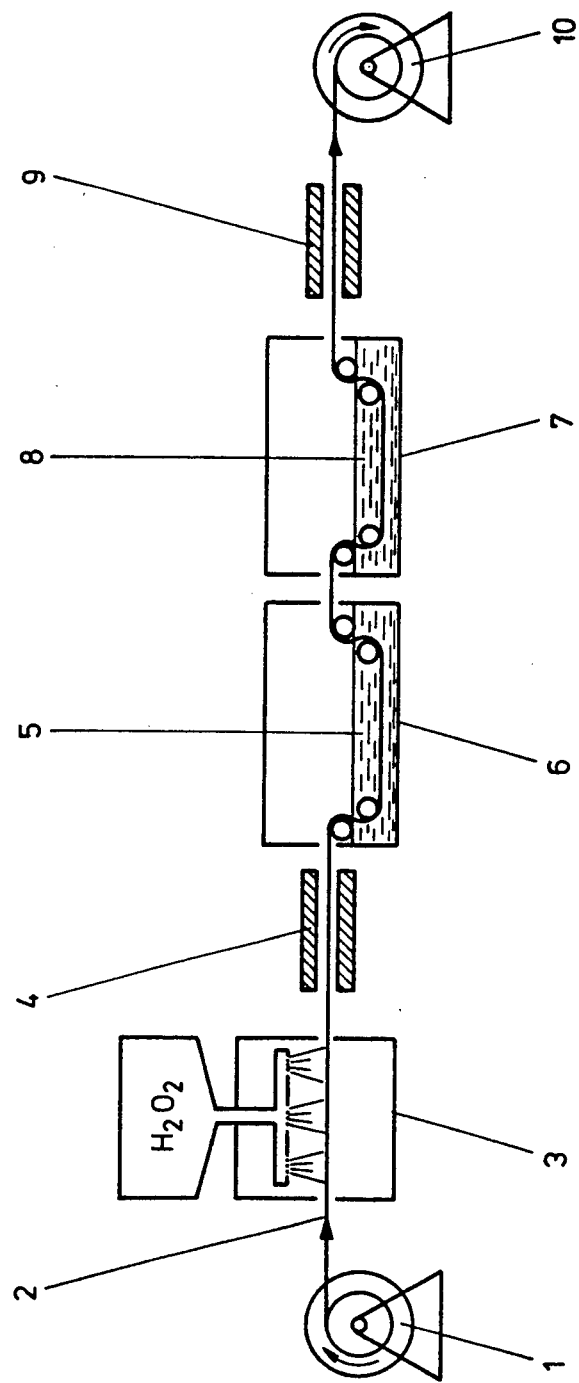

PROCESS FOR MANUFACTURING NEGATIVE CADMIUM ELECTRODES FOR SEALED ALKALINE BATTERY CELLS

BACKGROUND OF THE INVENTION

The present invention relates generally to the manufacture of negative cadmium electrodes for sealed alkaline battery cells, in strip form, which are subjected to a partial oxidation to form a charge reserve by a chemical treatment with oxidizing agents outside the cell.

It is known that in alkaline battery cells operating under sealed conditions (e.g., of the Ni/Cd type) it is not sufficient to design the two electrode polarities with equal capacities, since a degree of overload protection should also be present in addition to the required rated capacity of the cell, and to avoid pole reversal during discharge with high currents. Thus, the negative electrode capacity in a cell designed for stable operation (i.e. a well "balanced" cell) is always overdimensioned in comparison to the positive electrode so that the negative electrode has a useful capacity component corresponding to the positive electrode capacity, and an excess capacity which is divided between a charge reserve and an electrode reserve. In the fully discharged state of the cell, the negative electrode is discharged only partially, such that dischargeable $Cd_{met}$ is still present in the amount of the available discharge reserve. In the fully charged state of the cell, the negative electrode is charged only partially, as distinguished from the positive electrode, and maintains this state even during continued charging. This is because the negative charging current which continues to flow does not reduce further $Cd(OH)_2$ to $Cd_{met}$, but only converts the oxygen developed in equivalent quantity on the positive electrode. The negative cadmium electrode thus remains partially oxidized to the extent of the intended charge reserve.

A proven method which has long been used in the manufacture of sealed batteries involves bringing completely assembled, but still open cells to the above-mentioned fully charged state by electrical treatment, whereupon the cells are sealed as rapidly as possible. However, in view of the expensive equipment needed, and the processing time and manpower required, attempts have been made to balance the electrodes prior to being installed and to prepare the electrodes chemically or electrochemically in such a way that ready-to-use cells are immediately obtained after the electrodes have been introduced into the container, the electrolyte has been added, and the cell has been sealed. Depending on whether the process is based on uncharged or charged negative electrode material, the state necessary for this is reached either by chemical or electrochemical partial oxidation, or by partial reduction.

West German Patent Application No. P 34 16 817 suggests the use of hydrogen peroxide as a highly advantageous agent for the partial oxidation of a negative electrode strip (so-called electrodeposit electrode), which is already highly active due to its processing. After washing and drying, a partially oxidized negative strip is obtained which is sufficiently stable with regard to its capacity. Cut into electrodes, this strip can be combined with positive electrodes which are adjusted accordingly with respect to their total capacity and their state of charge. A cell built with electrodes pretreated in this manner can be sealed immediately after the introduction of the necessary amount of electrolyte (usually a KOH solution), and can be put into operation immediately without any expensive electrical treatments.

Introduction of the electrolyte into the already fully assembled, but as yet unsealed cell is automatically carried out in conventional manner, e.g. by means of reciprocating pumps at very high production rates. However, in this process, the evolution of heat, which is dependent on cell size, has been found to be disturbing. Such evolution of heat is caused by decomposition of the heavy metal peroxides which are spontaneously formed in the alkaline medium by the desorption of oxygen, as well as by the heat of hydration released during the wetting of the still dry electrodes. Even small cells can reach temperatures of up to 70° C. within a few seconds, and still higher temperatures are reached in the larger cells.

Bubbling caused by boiling and sputtering of the electrolyte tends to reduce the accuracy of metering, and the high temperatures are harmful in themselves because they tend to accelerate degradation of polyamide separators, and to cause changes in the pre-established electrode balance.

SUMMARY OF THE INVENTION

It is therefore the primary object of the present invention to eliminate the above-mentioned shortcomings, to make it possible to take full advantage of balancing processes which take place outside of the cells under construction.

This and other objects are achieved according to the present invention in a process for manufacturing negative cadmium electrodes for sealed alkaline battery cells, in strip form, and which are subjected to partial oxidation to form a charge reserve by a chemical treatment with oxidizing agents outside the cell, by subjecting the electrode strip to a treatment in an alkaline solution, either after or during such partial oxidation, but before the cell is sealed, to decompose the heavy metal peroxides formed and to hydrogenate CdO into $Cd(OH)_2$. As a consequence of this treatment, the decomposition, desorption and hydrogenation processes associated with introduction of the electrolyte, and especially the conversion of CdO into $Cd(OH)_2$, are decoupled from those processes which are associated with the construction of the cell, and are transferred to those processes which are associated with the manufacture of the electrodes.

For further discussion regarding a process in accordance with the present invention, reference is made to the detailed description which follows, taken in conjunction with a single illustration which schematically illustrates the steps of a preferred manufacturing process.

DETAILED DESCRIPTION OF A PREFERRED EMBODIMENT

The accompanying illustration schematically illustrates a preferred process and process implementation according to the present invention. An endless strip 2 is drawn from a delivery roll 1, and preferably takes the form of an active cadmium strip prepared according to the electrodeposit process and containing exclusively $Cd_{met}$. The endless strip 2 is first subjected to a spray treatment with a precisely determined quantity of an $H_2O_2$ solution, at treatment station 3, to establish the partially oxidized state required for ultimate incorporation into a cell. The endless strip 2 then passes through a drying section 4 and to an immersion bath 6.

Immersion bath 6 is filled with an alkaline hydroxide solution 5 to decompose the cadmium peroxide (and possibly also nickel peroxide) in the carrier material, as well as to hydrogenate the electrochemically inactive CdO. The decomposing and hydrogenating bath 6 is preferably followed by an immersion bath 7 containing a dilute acid, e.g. a boric acid solution 8, which neutralizes the alkali introduced by the endless strip 2 from the immersion bath 6. The endless strip 2 finally passes through another drying section 9 and is wound up on the roll 10.

After being processed as previously described, the endless strip 2 can then be cut into electrodes of the desired dimensions and can be combined, either immediately or after storage, with counterelectrodes of appropriate dimension and subjected to appropriate pretreatment. Sealed cells can then be produced after the trouble-free, automatic introduction of the necessary amount of electrolyte, and can be put into operation immediately and without any further manipulations.

Thus, in accordance with the present invention, balanced electrodes, pretreated with oxidizing agents such as hydrogen peroxide or potassium peroxydisulfate solutions (especially cadmium electrodes of the electrodeposit or sintered type), are passed through an alkaline immersion bath, preferably an aqueous KOH or NaOH solution. In this bath, the heavy metal peroxides (e.g., cadmium peroxide) spontaneously decompose, while oxygen and heat are removed before the electrodes are incorporated into a cell. Thus, the concentration of the alkaline hydroxide in the immersion bath should be high enough for the hydrogenation of the cadmium oxide to take place quickly and completely. *

*(The concentration of the alkaline hydroxide (KOH or NaOH) is between at least about 0,1 moles l and saturation)

Reducing agents with an alkaline pH (e.g., sodium sulfide, sodium sulfite, hydrazine or hydroxylamine) are also suitable for decomposing such heavy metal peroxides. Depending on the processing steps which follow, it is also possible to use solutions with the density and composition of the electrolyte to be used subsequently.

To maintain their state of charge (balance), the electrodes must subsequently be washed according to conventional methods to remove all traces of alkali, and then dried, unless an immediate protective processing is carried out (e.g., under protective gas) to prevent autooxidation of the active electrode mass.

The use of strip-shaped electrode materials makes it possible to carry out decomposition after oxidation with hydrogen peroxide in a continuous process, or even to carry out the two processes at the same time. This latter procedure can be carried out according to the present invention by simultaneously exposing the electrode strip to the oxidizing agent needed for the partial oxidation, and the alkaline hydroxide solution, for example, by combining the two solutions in one spray nozzle. In practice, this measure serves the purpose of carrying out the partial oxidation of the strip with an alkaline hydrogen peroxide solution.

A further processing step which is advantageously capable of being added to the above-described continuous process is to immediately neutralize the alkali retained in the pores of the electrodes to preserve their capacity and hence the electrode balance, in turn maintaining the set state of charge of the electrode. This may be accomplished according to the present invention by passing the treated electrode strip through an immersion bath containing a weakly acidic solution. The solution of a weak inorganic acid at a concentration exceeding the stoichiometric quantity needed for neutralization is advantageous in this regard. A boric acid solution proves to be especially favorable for this purpose, although metal salt solutions with an acidic pH (e.g., cadmium sulfate or nickel sulfate solutions) can also be considered for use.

The pH values of both the decomposing bath and the neutralizing bath are preferably monitored automatically, and the bath concentrations are preferably maintained at constant values by means of conventionally available metering devices. If the bath concentrations are coordinated in this fashion, and if boric acid is used as the neutralizing agent, subsequent washing of the treated electrode strips can be omitted. The electrode strips may be dried according to any commonly used process.

The small quantities of boric acid which remain in the pores of the electrodes serve to lastingly preserve the partially charged electrode strip, so that there occurs neither a marked shift in the balanced state of charge, nor an unfavorable carbonization due to the taking up of carbon dioxide from the air, even during storage in air for several days.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A process for manufacturing negative cadmium electrodes for sealed alkaline battery cells, in strip form, wherein said electrodes are subjected to partial oxidation to form a charge reserve by a chemical treatment with oxidizing agents outside said cells, and wherein said process comprises the step of:

subjecting the electrode strip to treatment in an alkaline solution, after or during said partial oxidation and prior to incorporation into a cell, to decompose formed heavy metal peroxides and to hydrogenate CdO into $Cd(OH)_2$.

2. The process of claim 1 wherein said alkaline solution is an aqueous potassium hydroxide or sodium hydroxide solution.

3. The process of claim 1 wherein said alkaline solution is a reducing agent with an alkaline pH.

4. The process of claim 3 wherein said reducing agent is selected from the group consisting of sodium sulfide, sodium sulfite, hydrazine and hydroxylamine.

5. The process of claim 1 wherein said alkaline solution has the density and composition of the electrolyte to be used in said cells.

6. The process of claim 1 wherein the treatment is carried out by immersion in a continuous process.

7. The process of claim 1 wherein the treatment is carried out during said partial oxidation by simultaneously admitting a solution including the oxidizing agent used for said partial oxidation and the alkaline solution used for said treatment from a common spray nozzle.

8. The process of claim 1 wherein said treatment is followed by a neutralizing immersion treatment in a weak acid.

9. The process of claim 8 wherein said immersion treatment is in a boric acid solution.

10. The process of claim 8 wherein the concentration of said acid exceeds the stoichiometric quantity needed for neutralization.

11. The process of claim 8 wherein the electrode strip is continuously passed through immersion baths arranged in series for said alkaline treatment and for said neutralizing treatment.

12. The process of claim 1 wherein said treatment is followed by a neutralizing immersion treatment in a metal salt solution with an acidic pH.

13. The process of claim 12 wherein the metal salt solution is a cadmium sulfate solution or a nickel sulfate solution.

14. The process of claim 1 wherein said oxidizing agent is hydrogen peroxide or potassium peroxydisulfate.

* * * * *